US007020360B2

(12) United States Patent
Satomura et al.

(10) Patent No.: US 7,020,360 B2
(45) Date of Patent: Mar. 28, 2006

(54) WAVELENGTH DISPERSION PROBING SYSTEM

(75) Inventors: Hiroaki Satomura, Tokyo (JP); Shinya Fujita, Tokyo (JP); Junichi Ukita, Tokyo (JP); Katsuhiko Watanabe, Tokyo (JP)

(73) Assignee: Advantest Corporation, Tokyo (JP)

(*) Notice: Subject to any disclaimer, the term of this patent is extended or adjusted under 35 U.S.C. 154(b) by 0 days.

(21) Appl. No.: 10/495,415

(22) PCT Filed: Nov. 12, 2002

(86) PCT No.: PCT/JP02/11758

§ 371 (c)(1), (2), (4) Date: Oct. 19, 2004

(87) PCT Pub. No.: WO03/042652

PCT Pub. Date: May 22, 2003

(65) Prior Publication Data

US 2005/0094936 A1 May 5, 2005

(30) Foreign Application Priority Data

Nov. 13, 2001 (JP) ............................ 2001-347897

(51) Int. Cl.
*G02B 6/26* (2006.01)
*G01N 21/00* (2006.01)

(52) U.S. Cl. ....................................... 385/27; 356/73.1

(58) Field of Classification Search ................. 385/15, 385/27; 356/73.1

See application file for complete search history.

(56) References Cited

U.S. PATENT DOCUMENTS

| | | | | |
|---|---|---|---|---|
| 5,956,131 | A * | 9/1999 | Mamyshev et al. | 356/73.1 |
| 6,580,499 | B1 * | 6/2003 | Aoki et al. | 356/73.1 |
| 6,580,500 | B1 * | 6/2003 | Aoki et al. | 356/73.1 |
| 6,587,607 | B1 * | 7/2003 | Aoki et al. | 385/15 |
| 6,594,005 | B1 * | 7/2003 | Aoki et al. | 356/73.1 |
| 6,819,473 | B1 * | 11/2004 | Aoki et al. | 359/326 |
| 2002/0122171 | A1 * | 9/2002 | Aoki et al. | 356/73.1 |

FOREIGN PATENT DOCUMENTS

| | | |
|---|---|---|
| JP | 10-83006 | 3/1998 |
| JP | 11-148333 | 1/1999 |
| JP | 2000-121500 | 4/2000 |

* cited by examiner

*Primary Examiner*—Sarah Song
(74) *Attorney, Agent, or Firm*—Dellett & Walters

(57) ABSTRACT

A wavelength dispersion probing system for determining a value of wavelength dispersion and its sign and reducing the trouble and time required for this determination. This wavelength dispersion probing system comprises light sources 10, 12, light attenuators 14, 16, optical multiplexer 18, phase modulator 20, optical amplifiers 22, 26, acoustooptical modulator 24, optical receiver 30. The intensity ratio of two wavelengths is set at 1 to 2 to detect Stokes light or anti-Stokes light included in the return light of an optical fiber 100 by the optical receiver 30, so that wavelength dispersion is probed. The wavelength dispersion is probed by changing the intensity ratio of the two wavelengths to observe the state of the change of the wavelength dispersion, so that the sign of wavelength dispersion is determined by the optical receiver 30.

11 Claims, 3 Drawing Sheets

F/G. 1
λ1
λ2
ATT
ATT
PHASE MODULATOR
AOM
OPTICAL RECEIVER
ADJUSTABLE NARROW-BAND OPTICAL FILTER
DET
I/V CONVERTER
BPF
OSCILLO-SCOPE
WAVELENGS DISPERSION CALCULATING SECTION
PULSE GENERATOR
DISPLAY SECTION
CONTROL SECTION
SIGN JUDGING SECTION
a
b
c
10
12
14
16
18
20
22
24
26
28
30
32
34
36
38
40
42
44
46
48
50
52
60
100

WAVELENGTH DISPERSION PROBING SYSTEM

TECHNICAL FIELD

The present invention relates to a wavelength dispersion probing system which determines the wavelength dispersion and its sign of an optical fiber.

BACKGROUND ART

Generally, an optical fiber used for usage such as communication has wavelength dependency in a longitudinal direction. For this reason, in particular, in order to transmit a signal accurately by using an optical fiber used for a channel whose line length is long, it is necessary to take this wavelength dependency into consideration. What expresses this wavelength dependency is a "distributed map." This distributed map shows the relationship between the distance in the longitudinal direction and the wavelength dispersion of an optical fiber. As prior art for determining a distributed map, an apparatus disclosed in Japanese Patent Laid-Open No. 10-83006 is known.

The operation principle of this apparatus is to detect Stokes light or anti-Stokes light out of the return light which is obtained by entering the pulsed light, in which two kinds of rays which have wavelengths $\lambda_1$ and $\lambda_2$ are included, into an optical fiber, and to obtain wavelength dispersion D on the basis of a frequency of this detection output. By using this method, it becomes possible to produce correctly and easily the distributed map showing the relationship between the distance z along the longitudinal direction of the optical fiber and the wavelength dispersion D in its place by a method like Optical Time Domain Reflectometry (OTDR).

By the way, since the calculation of wavelength dispersion D using the apparatus disclosed in the gazette mentioned above calculates on the basis of the frequency of intensity amplitude of the detected light, only the absolute value can be found, but there is a problem that a sign is not known. However, in actually using an optical fiber as a channel, the sign of wavelength dispersion D is also required. For example, in designing the channel, which is a grade where wavelength dispersion can be disregarded mostly as a whole, by connecting two or more kinds of optical fibers which have predetermined wavelength dispersion, it becomes important whether the wavelength dispersion has a positive value or it has a negative value. Since the sign of wavelength dispersion is not found by the method disclosed in the gazette mentioned above, the sign of wavelength dispersion is measured by another method, and hence, there is a problem that determination requires troubles and time since it is necessary to change apparatuses connecting optical fibers or to prepare an apparatus determining the sign of wavelength dispersion in addition to the distributed map.

DISCLOSURE OF THE INVENTION

The present invention is created in view of such points, and aims at providing a wavelength dispersion probing system which can determine the value of wavelength dispersion and its sign and can decrease troubles and time required for the determination.

The wavelength dispersion probing system of the present invention comprises an incident mechanism of entering pulsed light, in which an intensity ratio of two wavelength components having a predetermined gap is adjustably set, into one end of a fiber under test, an intensity ratio setting unit of setting the intensity ratio of two wavelength components to this incident mechanism, a detection unit of detecting at least one of Stokes light or anti-Stokes light out of return light emitted from the one end of the fiber under test, and generating an electric detection signal, a frequency calculating unit of calculating a frequency of the detection signal, a wavelength dispersion calculating unit of calculating the wavelength dispersion of the fiber under test based on the frequency calculated by the frequency calculating unit, and a sign judging unit of determining a sign of wavelength dispersion on the basis of the multiple times of calculation results of the wavelength dispersion by the frequency calculating unit performed before and after modifying the intensity ratio of two wavelength components by the intensity ratio setting unit.

It is possible to obtain the wavelength dispersion and its sign only by changing the intensity ratio of two kinds of wavelength components entered into the fiber under test and repeating the determination of the wavelength dispersion. In particular, in comparison with the case that the wavelength dispersion and its sign are determined by separate apparatuses, it becomes possible to decrease the troubles and time of determination greatly.

In addition, it is desirable to perform the sign judgment of the wavelength dispersion by the sign judging unit by not only setting the intensity ratio of two wavelength components at 1 to 2 by the intensity ratio setting unit mentioned above and obtaining the wavelength dispersion by the wavelength dispersion calculating unit, but also setting the intensity ratio of two wavelength components at except 1 to 2 by the intensity ratio setting unit and comparing a value, calculated by the wavelength dispersion calculating unit, with the value of wavelength dispersion. It is possible to easily know the sign of wavelength dispersion by investigating a generation state of a gap since this gap is generated in the direction according to the sign of the wavelength dispersion by setting this intensity ratio at except 1 to 2 when the accurate wavelength dispersion is obtained when the intensity ratio of two wavelength components is set at 1 to 2.

In addition, it is desirable that the incident mechanism mentioned above comprises two light sources generating respective light of two wavelength components independently, an optical multiplexer synthesizing the light outputted from the two light sources, a pulse forming unit forming pulses from the output light of the optical multiplexer, and a light attenuator being inserted between from the two light sources to the optical multiplexer and changing the intensity of light outputted from at least one of the two light sources. Alternatively, it is desirable that the incident mechanism mentioned above comprises two light sources generating respective light of two wavelength components independently, an optical multiplexer synthesizing the light outputted from two light sources, a pulse forming unit forming pulses from the output light of the optical multiplexer, a modulator being inserted between from the two light sources to the optical multiplexer and adjustably attenuating the light outputted from at least one of the two light sources. Alternatively, it is desirable that the incident mechanism mentioned above comprises two light sources independently generating respective light of two wavelength components whose intensities are adjustable, an optical multiplexer synthesizing the light outputted from two light sources, a pulse forming unit forming pulses from the output light of the optical multiplexer. These methods make it possible to arbitrary set the intensity ratio of light of two wavelength components, and to perform the determination of wavelength dispersion and its sign judgment without adding special structure on the way of operation or changing the connection of the fiber under test.

In addition, it is desirable that the incident mechanism mentioned above further comprises a circulator not only entering the output light of the optical multiplexer into one end of the fiber under test, but also entering the return light, emitted from this one end, into the detection unit. This makes it possible not only to enter pulsed light into the fiber under test with little loss, but also to lead the return light from the fiber under test to the detection unit.

Furthermore, it is desirable that the detection unit mentioned above comprises an optical filter extracting Stokes light or anti-Stokes light which is a detection target included in the return light, and a detection signal forming unit detecting the intensity of the light component extracted by making the optical filter passed and generating a detection signal. Owing to this, it becomes possible to extract only a light component necessary for the determination of wavelength dispersion, and to detect its intensity.

In addition, it is desirable to further comprise a display unit visually and identifiably displaying a sign as judgment result by the sign judging unit mentioned above. Thereby, the operation of verifying the sign of wavelength dispersion becomes easy.

A wavelength dispersion probing method of the present invention includes a step of entering pulsed light, in which an intensity ratio of two wavelength components having a predetermined gap is adjustably set, into one end of a fiber under test, a step of setting an intensity ratio of two wavelength components, a step of detecting at least one of Stokes light or anti-Stokes light out of the return light emitted from the one end of the fiber under test, and generating an electric detection signal, a step of calculating a frequency of the detection signal, a step of calculating the wavelength dispersion of the fiber under test on the basis of the calculated frequency of the detection signal, and a step of determining a sign of wavelength dispersion on the basis of the multiple times of calculation results of the wavelength dispersion performed before and after modifying the intensity ratio of two wavelength components. By performing this wavelength dispersion measuring method, it is possible to obtain the wavelength dispersion and its sign only by changing the intensity ratio of two kinds of wavelength components entered into the fiber under test and repeating the determination of the wavelength dispersion. In particular, in comparison with the case that the wavelength dispersion and its sign are determined by separate apparatuses, it becomes possible to decrease the troubles and time of determination greatly.

BEST MODE FOR CARRYING OUT THE INVENTION

Hereafter, a wavelength dispersion probing system where the present invention is applied will be described with referring to drawings.

Figure 1:
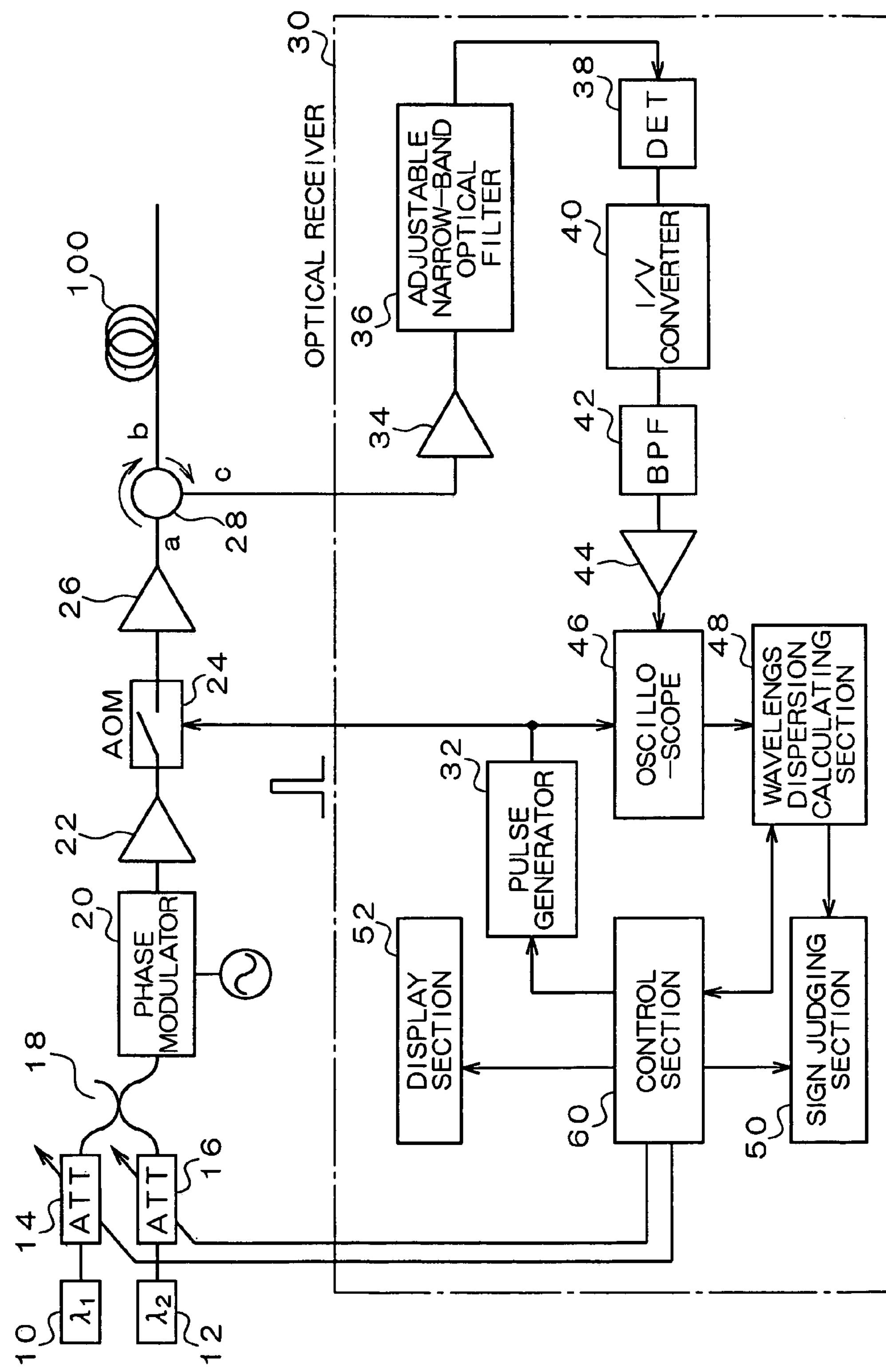
FIG. 1 is a diagram showing the structure of a wavelength dispersion probing system of an embodiment.

FIG. 1 is a diagram showing the structure of the wavelength dispersion probing system of an embodiment. The wavelength dispersion probing system shown in FIG. 1 is for determining the wavelength dispersion D and its sign of an optical fiber 100 as a fiber under test (FUT). This wavelength dispersion probing system comprises light sources 10 and 12, light attenuators 14 and 16, an optical multiplexer 18, a phase modulator 20, optical amplifiers 22 and 26, an acoustooptical modulator (AOM) 24, a circulator 28, and an optical receiver 30.

The two light sources 10 and 12 output continuation wave light (CW light) in wavelengths $\lambda_1$ and $\lambda_2$ which shift mutually by $\delta\lambda$, respectively. The light attenuator 14 adjusts the intensity of light in wavelength $\lambda_1$, entered from the one light source 10, by adjustably changing the attenuation of the light, which is passed, and emit it. Similarly, the light attenuator 16 adjustably changes the intensity of light in wavelength $\lambda_2$, entered from the other light source 12, by adjustably changing the attenuation of the light, which is passed, and emit it.

The optical multiplexer 18 synthesizes the light in two kinds of wavelengths $\lambda_1$ and $\lambda_2$ emitted from the respective two light attenuators 14 and 16. The phase modulator 20 performs phase modulation of the light entered from the optical multiplexer 18. The line width of the light becomes wider by this phase modulation. The optical amplifier 22 amplifies the light emitted from the phase modulator 20. The acoustooptical modulator 24 transforms the continuous wave light, entered from the optical amplifier 22, into pulses. The optical amplifier 26 amplifies the light, transformed into pulses by the acoustooptical modulator 24, and generates the pulsed light with large amplitude. This pulsed light is entered into one end of the optical fiber 100 via the circulator 28.

The circulator 28 has an incident end a to which an emitting end of the optical amplifier 26 is connected, an incident and emitting end b to which the one end of the optical fiber 100 is connected, and an emitting end c to which the optical receiver 30 is connected. While the light entered into the incident end a is emitted from the incident and emitting end b, the light entered into the incident and emitting end b is emitted from the emitting end c. Therefore, the circulator 28 emits the return light generated by Rayleigh back scattering of this optical fiber 100 to the optical receiver 30 while emitting the pulsed light entered from the optical amplifier 26 toward the optical fiber 100. By using the circulator 28, with little loss, it is possible to enter the pulsed light to the one end of the optical fiber 100, but also to lead the return light from this optical fiber 100 to the optical receiver 30.

The optical receiver 30 determines the wavelength dispersion and its sign of the optical fiber 100 on the basis of the return light of the optical fiber 100 emitted from the circulator 28. For this reason, the optical receiver 30 comprises a pulse generator 32, an ER fiber amplifier 34, an adjustable narrow-band optical filter 36, a photo detector (DET) 38, a current/voltage (I/V) converter 40, a band pass filter (BPF) 42, an amplifier 44, an oscilloscope 46, a wavelength dispersion calculating section 48, a sign judging section 50, a display section 52, and a control section 60.

The pulse generator 32 generates a pulse signal inputted into the acoustooptical modulator 24.

The ER fiber amplifier 34 is an optical fiber amplifier with which erbium is added, and amplifies the return light entered from the circulator 28. Although the Stokes light or anti-Stokes light, which is included in the return light emitted from the optical fiber 100, is used in the wavelength dispersion determination of this embodiment, these occur by a third-order non-linear phenomenon of the light by four light wave mixing, are very minute, and are amplified by the ER fiber amplifier 34.

The adjustable narrow-band optical filter 36 passes selectively only the light at wavelength $\lambda_s$ of the Stokes light or wavelength $\lambda_A$ of anti-Stokes light which becomes an object of the wavelength dispersion determination. The photo detector 38 detects the light (Stokes light or anti-Stokes light) passed through the adjustable narrow-band optical filter 36. For example, from the photo detector 38, a current having a value proportional to the intensity of the detected light is outputted. The current/voltage converter 40 converts the output current of the photo detector 38 into a voltage.

The band pass filter 42 inputs the detection signal converted into a voltage by the current/voltage converter 40, and passes a frequency component from, for example, 50 kHz to 300 kHz. Thereby, only the component necessary for the determination of the Stokes light or anti-Stokes light is extracted. The amplifier 44 amplifies electrically the detection signal passing through the bandpass filter 42. Thus, by performing amplification electrically after the photo detector 38 detects the intensity of the light extracted by the adjustable narrow-band optical filter 36, it becomes possible to extract only the light component necessary for the determination of the wavelength dispersion, and to detect its intensity.

The oscilloscope 46 not only fetches and holds the detection signal, amplified by the amplifier 44, by the digital sampling at a predetermined frequency, and displays its contents. In addition, this oscilloscope 46 has a storage function of fetching and accumulating the data of the detection signal repeatedly obtained under the same conditions, and a function of outputting this accumulated data outside.

The wavelength dispersion calculating section 48 calculates the wavelength dispersion of the optical fiber 100 corresponding to wavelengths $\lambda_1$ or $\lambda_2$ on the basis of the data held by the oscilloscope 46. The sign judging section 50 judges the sign of this wavelength dispersion on the basis of the wavelength dispersion calculated by the wavelength dispersion calculating section 48. The display section 52 displays the calculation result by the wavelength dispersion calculating section 48, and the judged result by the sign judging section 50. The display of this judged result (sign of wavelength dispersion) is performed easily identifiably by a user just glancing. For example, if the sign of wavelength dispersion is positive, a predetermined display area is displayed redly, and if negative, this display area is displayed bluely. Alternatively, if the sign of wavelength dispersion is positive, a mark of "+" is displayed on a predetermined position on the screen, and if negative, a mark of "–" is displayed on this predetermined position. Thereby, the operation of verifying the sign of wavelength dispersion becomes easy.

By sending an instruction of a pulse output to the pulse generator 32, the control section 60 controls the start timing of wavelength dispersion, or controls a variable amount of the light intensity by each of two light attenuators 14 and 16.

The above-mentioned light sources 10 and 12, light attenuators 14 and 16, optical multiplexer 18, phase modulator 20, optical amplifiers 22 and 26, acoustooptical modulator 24, and circulator 28 correspond to the incident mechanism. In addition, the control section 60 in the optical receiver 30 corresponds to the intensity ratio setting unit, and the ER fiber amplifier 34, adjustable narrow-band optical filter 36, photo detector 38, current/voltage converter 40, bandpass filter 42, and amplifier 44 does to the detection unit, respectively. The wavelength dispersion calculating section 48 corresponds to the frequency calculating unit and wavelength dispersion calculation unit, and the sign judging section 50 does to the sign judging unit, respectively. The acoustooptical modulator 24 corresponds to the pulse forming unit. The photo detector 38, current/voltage converter 40, band pass filter 42, and amplifier 44 correspond to the detection signal forming unit. The display section 52 corresponds to the display unit.

The wavelength dispersion probing system of this embodiment has such structure, and then, its operation will be explained.

(1) Principle of Wavelength Dispersion Probing

The wavelength dispersion probing of this embodiment follows fundamentally the measurement principle disclosed in Japanese Patent Laid-Open No. 10-83006. First, a rough measurement principle will be explained. In addition, the case that Stokes light is detected in order to measure the wavelength dispersion of the optical fiber 100 corresponding to the wavelength $\lambda_1$ will be explained, but in regard to the wavelength dispersion of the optical fiber 100 corresponding to the wavelength $\lambda_2$, it is possible to perform it in the same procedure by using anti-Stokes light.

The intensity of the Stokes light detected within the optical receiver 30 is oscillated at the spatial frequency expressed by the following formula:

$$Fs = \frac{1}{\Lambda s} = \frac{\delta k}{2\pi} = cD(\lambda_1)\left(\frac{\delta\lambda}{\lambda}\right)^2 \tag{1}$$

Here, δk denotes a wave vector mismatch in first mixing process and second mixing process. The first mixing process is a process of forming a Stokes photon at wavelength $\lambda_s$ by combining two photons at wavelength $\lambda_1$ with one photon at wavelength $\lambda_2$, and the second mixing process is a process of forming an anti-Stokes photon at wavelength $\lambda_A$ by combining two photons at wavelength $\lambda_2$ with one photon at wavelength $\lambda_1$. Symbol c denotes the velocity of light, and δλ is the difference between the wavelengths $\lambda_1$ and $\lambda_2$ of the light outputted from the two light sources 10 and 12. In addition, D ($\lambda_1$) denotes the wavelength dispersion of the optical fiber 100 corresponding to the light at wavelength $\lambda_1$.

Therefore, it is possible to obtain a distributed map ($\lambda_1$, z) at a space resolution $\Lambda_s$ by determining an intensity oscillation frequency Fs (z) of Stokes light.

By the way, although the frequency Fs (z) mentioned above shows the intensity oscillation frequency of Stokes light with paying attention to the distance z from the incident end of the optical fiber 100, a detectable signal in the wavelength dispersion probing system shown in FIG. 1 is the intensity oscillation frequency of the Stalks light included in the return light. Let time from entering pulsed light into the optical fiber 100 to the detection of return light be t and let the intensity oscillation frequency of the Stalks light detected be $f_{sig}$, and there is the following relationship between this frequency $f_{sig}$ and the spatial frequency Fs mentioned above:

$$f_{sig}(t) = \frac{c}{2n} Fs(z) \tag{2}$$

Let a refractive index of the optical fiber 100 be n, and the relationship between the time t and the distance z is t=2 nz/c. When formulas (1) and (2) are transformed in consideration of this relationship, wavelength dispersion D becomes as follows:

$$D(\lambda_1, z) = \frac{2n}{c}\left(\frac{\lambda_1}{\delta\lambda}\right)^2 f_{sig}\left(t = \frac{2n}{c}z\right) \tag{3}$$

That is, it is possible to obtain the relationship between the distance z, corresponding to this time t, and the wavelength dispersion D by determining the value of the frequency $f_{sig}$ of the Stokes light corresponding to the time t. Thus, what is graphed by making the distance z a horizontal axis and making the corresponding value of the wavelength dispersion D be a vertical axis is the distributed map.

(2) Principle of Sign Judgment of Wavelength Dispersion

A non-linear extent of contribution $\delta k_{nl}$ exists in the wave vector mismatch δk included in formula (1) mentioned above. Therefore, an actual wave vector mismatch δk' becomes as follows:

$$\delta k' = \delta k - \delta k_{nl} \tag{4}$$

In addition, the non-linear extent of contribution relating to a first mixing process corresponding to Stokes light can be expressed in the following formula:

$$\delta k_{nl} = \gamma(2P_1 - P_2) \tag{5}$$

Here, $P_1$ denotes the intensity of the component at the wavelength $\lambda_1$ included in light pulses entered in the optical fiber 100. $P_2$ denotes the intensity of the component at the wavelength $\lambda_2$ included in light pulses entered in the optical fiber 100.

In addition, γ included in formula (5) is expressed in the following formula:

$$\gamma = \frac{2\pi}{\lambda} \cdot \frac{n_2}{A_{eff}} \tag{6}$$

Here, $A_{eff}$ denotes an effective area of a core of the optical fiber 100. Symbol $n_2$ denotes a non-linear refractive index coefficient.

When the wavelength dispersion is determined according to the measurement principle mentioned above, a ratio of these ($P_1$:$P_2$) is set as 1 to 2 so that the non-linear extent of contribution $\delta k_{nl}$ may become zero.

By the way, the actual wavelength dispersion D has a sign, and in this embodiment, the sign of the wavelength dispersion is judged by observing how the value of wavelength dispersion changes when an intensity ratio ($P_1$:$P_2$) of two kinds of light is set at a value except 1 to 2.

Specifically, γ expressed in formula (6) certainly becomes positive. For this reason, $\delta k_{nl}$ expressed in formula (5) becomes positive or negative when the ratio of $P_1$ to $P_2$ is set except 1 to 2. For example, if the ratio of $P_1$ to $P_2$ is set to 1 to 1, $\delta k_{nl}$ certainly becomes positive.

On the other hand, with taking a sign into consideration, the relationship between the wave vector mismatch δk and the wavelength dispersion D is as follows:

$$\delta k(\lambda_1) = -2\pi c D(\lambda_1)\left(\frac{\delta\lambda}{\lambda}\right)^2 \tag{7}$$

That is, since the δk and wavelength dispersion D have signs opposite to each other, the wavelength dispersion D is positive when the δk is negative, and on the contrary, the wavelength dispersion D becomes negative when the δk is positive.

Therefore, assuming that the sign of the wavelength dispersion D is positive temporarily, the sign of the wave vector mismatch δk becomes negative. For this reason, if the ratio of $P_1$ to $P_2$ is set at 1 to 1, from formula (4), the positive $\delta k_{nl}$ is subtracted from the negative δk, and hence, an absolute value of the actual wave vector mismatch δk' becomes large. Hence, as shown in formula (1), the wavelength dispersion D becomes large.

Figure 2:
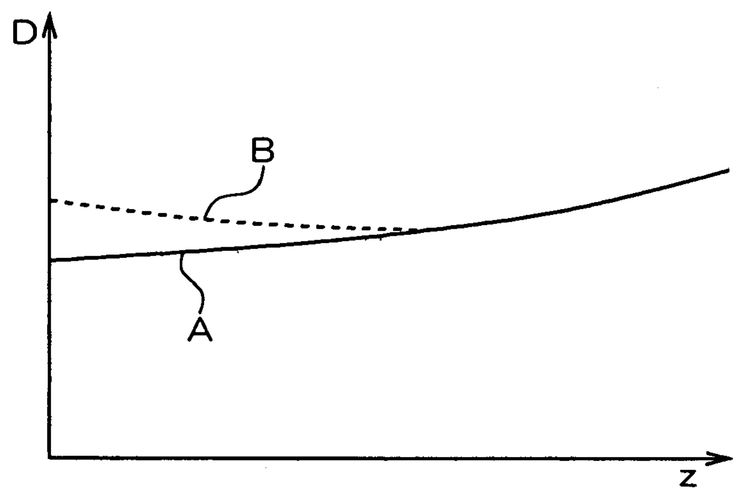
FIG. 2 is a graph showing the relationship between the wavelength dispersion, determined with setting an intensity ratio of two wavelength components at 1 to 2, and the wavelength dispersion, determined with setting it at 1 to 1, when the sign of the wavelength dispersion is positive.

FIG. 2 is a graph showing the relationship between the wavelength dispersion, determined with setting a ratio of $P_1$ to $P_2$ at 1 to 2, and the wavelength dispersion, determined with setting it at 1 to 1, when the sign of the wavelength dispersion is positive. In this graph, A denotes the wavelength dispersion when the ratio of $P_1$ to $P_2$ is 1 to 2, and B denotes the wavelength dispersion when the ratio of these is 1 to 1. When the result of two times of determinations performed by changing conditions becomes such relationship, it turns out that the sign of the wavelength dispersion D is positive.

On the contrary, assuming that the sign of the wavelength dispersion D is negative temporarily, the sign of the wave vector mismatch δk becomes positive. For this reason, if the ratio of $P_1$ to $P_2$ is set at 1 to 1, from formula (4), the negative $\delta k_{nl}$ is subtracted from the negative δk, and hence, an absolute value of the actual wave vector mismatch δk' becomes small. Hence, as shown in formula (1), the wavelength dispersion D becomes small.

Figure 3:
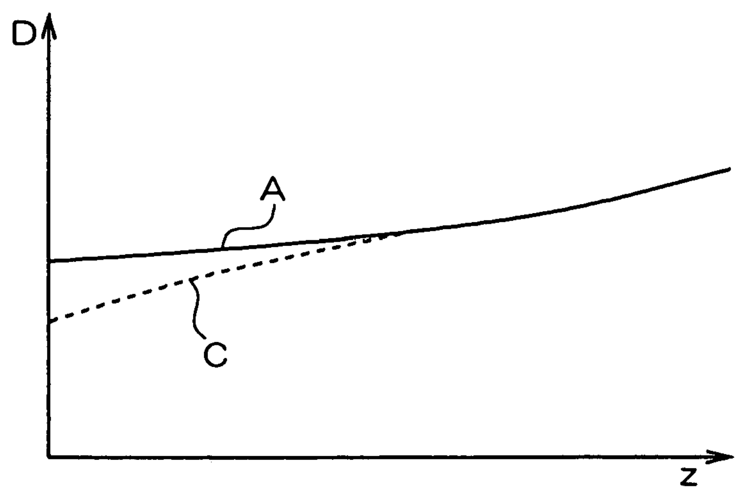
FIG. 3 is a graph showing the relationship between the wavelength dispersion, determined with setting a ratio of $P_1$ and $P_2$ at 1 to 2, and the wavelength dispersion, determined with setting it at 1 to 1, when the sign of the wavelength dispersion is negative.

FIG. 3 is a graph showing the relationship between the wavelength dispersion, determined with setting a ratio of $P_1$ to $P_2$ at 1 to 2, and the wavelength dispersion, determined with setting it at 1 to 1, when the sign of the wavelength dispersion is negative. In this graph, A denotes the wavelength dispersion when the ratio of $P_1$ to $P_2$ is 1 to 2, and C denotes the wavelength dispersion when the ratio of these is 1 to 1. When the result of two times of determinations performed by changing conditions becomes such relationship, it turns out that the sign of the wavelength dispersion D is negative.

(3) Specific Determining Operation Procedure

Figure 4:
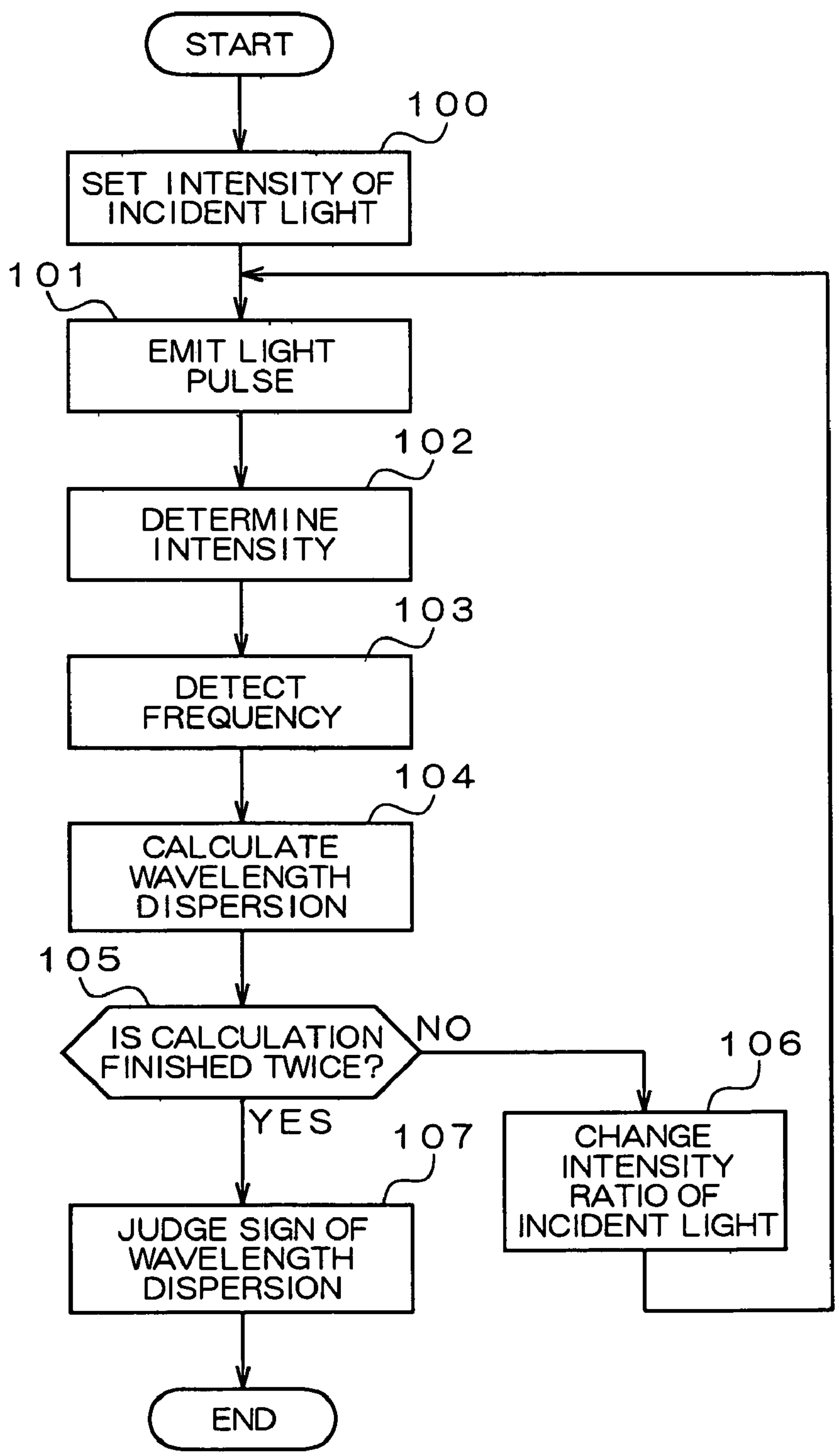
FIG. 4 is a flowchart showing the operational procedure of the dispersion probing system which performs the determination of wavelength dispersion and its sign judgment.

FIG. 4 is a flowchart showing the operational procedure of the dispersion probing system which performs the determination of wavelength dispersion and its sign judgment, and mainly shows the operation procedure of the optical receiver 30.

First, the control section 60 sets the intensity of the incident light into the optical fiber 100 (step 100). Specifically, the control section 60 sets the ratio of the intensity $P_1$ of light at the wavelength $\lambda_1$ to the intensity $P_2$ of light at the wavelength $\lambda_2$, which are entered into the optical fiber 100, at 1 to 2 by adjusting the attenuation of light attenuators 14 and 16. For example, the wavelength $\lambda_1$ is set at 1535 nm, the wavelength $\lambda_2$ is set at 1530 nm, and the intensity ratio of these is set at 1 to 2.

Next, the control section 60 in the optical receiver 30 sends an output instruction of a pulse signal to the pulse generator 32. Owing to this, after pulsed light is generated by the acoustooptical modulator 24 corresponding to the output timing of this pulse signal and is amplified by the optical amplifier 26, it is emitted towards the optical fiber 100 via the circulator 28 (step 101).

Thus, after the light pulse is entered into the optical fiber 100, the determination of the intensity of the return light is performed by the optical receiver 30 (step 102). As mentioned above, when the intensity ratio of respective light at wavelengths $\lambda_1$ and $\lambda_2$ is set at 1 to 2, it is necessary to detect the Stokes light at the wavelength $\lambda_s$ so as to determine the wavelength dispersion D to the wavelength $\lambda_1$. For this reason, in the adjustable narrow-band optical filter 36, only the component at the wavelength $\lambda_s$ is extracted out of the return light entered via the circulator 28, and a detection signal showing the intensity of this component is outputted from the amplifier 44. This detection signal is stored by a storage function of the oscilloscope 46. Actually, since this detection signal is very weak, the result of that two or more times of determinations under the same conditions are repeated is accumulated by the oscilloscope 46.

Next, the wavelength dispersion calculating section 48 reads the data saved by the storage function of the oscilloscope 46, and detects the intensity oscillation frequency $f_{sig}$ of the Stokes light (step 103). In addition, the wavelength dispersion calculating section 48 calculates the wavelength dispersion D corresponding to the distance z on the basis of this frequency $f_{sig}$ by using formula (3) mentioned above (step 104). Thereby, since it is possible to obtain the wavelength dispersion D of the optical fiber 100 corresponding to the wavelength $\lambda_1$, the distributed map is produced. The values and distributed map of the wavelength dispersion D which are calculated in this manner are displayed on the screen of the display section 52 by the control section 60 if needed.

Subsequently, the control section 60 judges whether the calculation of the wavelength dispersion mentioned above has finished twice (step 105). If the calculation of wavelength dispersion has been finished only once, negative judgment is performed, and for the second wavelength distribution determination, the control section 60 controls the attenuation of the two light attenuators 14 and 16 to change the intensity ratio of the incident light (step 106). An intensity ratio is set at a value other than 1 to 2, for example, 1 to 1, so that the non-linear extent of contribution relating to the first mixing process corresponding to the Stokes light shown in formula (5) may have a value other than zero. Then, it returns to step 101, the output operation of a light pulse or subsequent ones are repeated, and the second calculation of the wavelength dispersion is performed.

When the second calculation of the wavelength dispersion is finished, affirmative judgment is performed in the judgment at step 105. Next, the sign judging section 50 judges the sign of the wavelength dispersion by comparing the first calculation result of the wavelength dispersion corresponding to the case of the intensity ratio of two kinds of incident lights being 1 to 2 with the second calculation result of the wavelength dispersion corresponding to the case of this intensity ratio being 1 to 1 (step 107). Specifically, as shown in FIG. 2, if the value of the wavelength dispersion as the second measurement corresponding to reference numeral B is larger than the value of the wavelength dispersion as the first measurement corresponding to reference numeral A, it is judged that the sign of the wavelength dispersion is positive. On the contrary, as shown in FIG. 3, if the value of the wavelength dispersion as the second measurement corresponding to reference numeral C is smaller than the value of the wavelength dispersion as the first measurement corresponding to reference numeral A, it is judged that the sign of the wavelength dispersion is negative. The display (the sign is displayed by using color or various symbols such as "+" and "−") corresponding to the sign of the wavelength dispersion judged in this manner is performed by using the display section 52.

In addition, when the sign judgment of the wavelength dispersion mentioned above is performed, it is not necessary to necessarily produce a distributed map by obtaining the wavelength dispersion about the overall length of the optical fiber 100, but it is also good to compare the wavelength dispersion in one or several locations near the incident end of the optical fiber 100 where the effect of the non-linear extent of contribution relating to the first mixing process corresponding to Stalks light is large.

Thus, in the wavelength dispersion probing system of this embodiment, it is possible to obtain the wavelength dispersion and its sign by determining Stokes light with adjusting the intensity ratio of light at the two kinds of wavelengths $\lambda_1$ and $\lambda_2$ entered into the optical fiber 100. In particular, in comparison with the case that the wavelength dispersion and its sign are determined by separate apparatuses, it becomes possible to decrease the troubles and time of determination greatly.

In addition, the present invention is not limited to the embodiments mentioned above, and various modifications and implementations are possible within the scope of the gist of the present invention. For example, in the embodiment mentioned above, the wavelength dispersion of the optical fiber 100 corresponding to wavelength $\lambda_1$ is obtained by detecting the Stokes light as well as setting the ratio of respective intensities of two wavelengths $\lambda_1$ and $\lambda_2$ at 1 to 2, but it is also good to obtain the wavelength dispersion of the optical fiber 100 corresponding to wavelength $\lambda_2$ by detecting the anti-Stokes light as well as setting the ratio of respective intensities of two wavelengths $\lambda_1$ and $\lambda_2$ at 2 to 1.

Furthermore, in the embodiment mentioned above, the light attenuators 14 and 16 are provided in respective subsequent stages of the two light sources 10 and 12, but it is also good to provide only any one of these two light attenuators 14 and 16. In addition, since what the optical multiplexer 18 is required is just to synthesize the light of two wavelength components, it is also good to locate it in each of subsequent stages of the phase modulator 20, optical amplifier 22, and acoustooptical modulator 24.

Moreover, although the light attenuators 14 and 16 mentioned above are used, it is also good to use other methods where the intensities of two wavelength components are adjustable. For example, it is also good to give an adjustable loss to incident light by using modulators instead of the attenuators 14 and 16 or to perform adjustable amplification to incident light by using optical amplifiers instead of the attenuators 14 and 16. Alternatively, it is also good to control the output light intensities of respective light sources by the control section 60 in the optical receiver 30 by omitting the light attenuators 14 and 16 and instead using two light sources whose output light intensities each are adjustable.

INDUSTRIAL APPLICABILITY

As mentioned above, according to this invention, it is possible to obtain the wavelength dispersion and its sign only by adjustably changing the intensity ratio of two kinds of wavelength components entered into the fiber under test and repeating the determination of the wavelength dispersion. In particular, in comparison with the case that the wavelength dispersion and its sign are determined by separate apparatuses, it becomes possible to decrease the troubles and time of determination greatly.

The invention claimed is:

1. A wavelength dispersion probing system, comprising:

an incident mechanism of entering pulsed light, in which an intensity ratio of two wavelength components having a predetermined gap is adjustably set, into one end of a fiber under test;

an intensity ratio setting unit of setting the intensity ratio of the two wavelength components to the incident mechanism;

a detection unit of detecting at least one of Stokes light or anti-Stokes light out of return light emitted from one end of the fiber under test, and generating an electric detection signal;

a frequency calculating unit of calculating a frequency of the detection signal;

a wavelength dispersion calculating unit of calculating wavelength dispersion of the fiber under test on the basis of a frequency calculated by the frequency calculating unit; and a sign judging unit of judging a sign for wavelength dispersion on the basis of multiple calculation results of wavelength dispersion by the frequency calculating unit performed before and after modifying the intensity ratio of two wavelength components by the intensity ratio setting unit.

2. The wavelength dispersion probing system according to claim 1, characterized in that sign judgment of wavelength dispersion by the sign judging unit is performed by not only setting an intensity ratio of two wavelength components at 1 to 2 by the intensity ratio setting unit and obtaining the wavelength dispersion by the wavelength dispersion calculating unit, but also setting the intensity ratio of two wavelength components at a ratio other than 1 to 2 by the intensity ratio setting unit and comparing a value, calculated by the wavelength dispersion calculating unit, with the value of wavelength dispersion.

3. The wavelength dispersion probing system according to claim 1, characterized in that the incident mechanism comprises:

two light sources generating respective light of two wavelength components independently;

an optical multiplexer synthesizing the light outputted from two light sources;

a pulse forming unit forming pulses from the output light of the optical multiplexer; and a light attenuator being inserted between the two light sources and the optical multiplexer and changing the intensity of light outputted from at least one of the two light sources.

4. The wavelength dispersion probing system according to claim 1, characterized in that the incident mechanism comprises:

two light sources generating respective light of two wavelength components independently;

an optical multiplexer synthesizing the light outputted from two light sources;

a pulse forming unit forming pulses from the output light of the optical multiplexer; and a modulator being inserted between the two light sources and the optical multiplexer and adjustably attenuating the light outputted from at least one of the two light sources.

5. The wavelength dispersion probing system according to claim 1, characterized in that the incident mechanism comprises:

two light sources independently generating respective light of two wavelength components whose intensities are adjustable;

an optical multiplexer synthesizing the light outputted from two light sources; and a pulse forming unit forming pulses from the output light of the optical multiplexer.

6. The wavelength dispersion probing system according to claim 3, characterized in that the incident mechanism further comprises a circulator not only entering the output light of the optical multiplexer into one end of the fiber under test, but also entering the return light, emitted from this one end, into the detection unit.

7. The wavelength dispersion probing system according to claim 4, characterized in that the incident mechanism further comprises a circulator not only entering the output light of the optical multiplexer into one end of the fiber under test, but also entering the return light, emitted from this one end, into the detection unit.

8. The wavelength dispersion probing system according to claim 5, characterized in that the incident mechanism further comprises a circulator not only entering the output light of the optical multiplexer into one end of the fiber under test, but also entering the return light, emitted from this one end, into the detection unit.

9. The wavelength dispersion probing system according to claim 1, characterized in that the detection unit comprises:

an optical filter extracting Stokes light or anti-Stokes light which is a detection target included in the return light; and a detection signal forming unit detecting the intensity of the light component extracted bypassing through the optical filter and generating a detection signal.

10. The wavelength dispersion probing system according to claim 1, characterized in further comprising a display unit visually and identifiably displaying the sign as judgment result by the sign judging unit.

11. A wavelength dispersion probing method, characterized in comprising:

a step of entering pulsed light, in which the intensity ratio of two wavelength components having a predetermined gap is adjustably set, into one end of a fiber under test;

a step of setting an intensity ratio of two wavelength components;

a step of detecting at least one of Stokes light or anti-Stokes light out of return light emitted from the one end of the fiber under test, and generating an electric detection signal;

a step of calculating a frequency of the detection signal;

a step of calculating wavelength dispersion of the fiber under test on the basis of the frequency calculated by the frequency calculating unit; and a step of judging the sign of wavelength dispersion on the basis of multiple calculation results of the wavelength dispersion performed before and after modifying the intensity ratio of two wavelength components.

* * * * *